United States Patent
Kim

(10) Patent No.: US 7,413,337 B2
(45) Date of Patent: Aug. 19, 2008

(54) BACKLIGHT UNIT OF LIQUID CRYSTAL DISPLAY DEVICE AND METHOD OF ASSEMBLING THE SAME

(75) Inventor: Kyoung Sub Kim, Kyoungsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/322,506

(22) Filed: Dec. 19, 2002

(65) Prior Publication Data

US 2003/0142245 A1 Jul. 31, 2003

(30) Foreign Application Priority Data

Dec. 22, 2001 (KR) ................. 2001-83245

(51) Int. Cl.
*F21V 7/04* (2006.01)
(52) U.S. Cl. ........................... 362/633; 349/58
(58) Field of Classification Search ............ 362/561, 362/31, 551, 600, 602, 606, 608–614, 617, 362/623, 632–634; 349/63–65, 12, 58
See application file for complete search history.

(56) References Cited

U.S. PATENT DOCUMENTS

| | | | | |
|---|---|---|---|---|
| 5,654,779 A | * | 8/1997 | Nakayama et al. ............ | 349/58 |
| 5,966,191 A | * | 10/1999 | Lee .............................. | 349/58 |
| 6,053,619 A | * | 4/2000 | Nakamura et al. ............ | 362/31 |
| 6,347,873 B1 | * | 2/2002 | Hosseini et al. ............... | 362/31 |
| 6,595,651 B2 | * | 7/2003 | Jeong et al. ................... | 362/31 |
| 6,609,807 B2 | * | 8/2003 | Torihara et al. ............... | 362/31 |
| 6,634,761 B2 | * | 10/2003 | Ichikawa ..................... | 362/31 |

FOREIGN PATENT DOCUMENTS

KR 20-0247884 9/2001

* cited by examiner

*Primary Examiner*—Hargobind S Sawhney
(74) *Attorney, Agent, or Firm*—Birch, Stewart, Kolasch & Birch, LLP

(57) ABSTRACT

A backlight unit of a liquid crystal display device and a method of assembling the same which makes it easy to inspect for impurities and for reducing damage to an optical sheet. The backlight unit includes a lamp assembly; a light guide panel for providing the light from the lamp assembly incident to a display panel; and a bottom cover for supporting the lamp assembly and the light guide panel, wherein the distance between the lamp assembly located at opposite edges of the bottom cover is longer than the length of the light guide panel.

7 Claims, 2 Drawing Sheets

BACKLIGHT UNIT OF LIQUID CRYSTAL DISPLAY DEVICE AND METHOD OF ASSEMBLING THE SAME

BACKGROUND OF THE INVENTION

This application claims the benefit of Korean Application No. P2001-83245 filed on Dec. 22, 2001, which is hereby incorporated by reference.

1. Field of the Invention

The present invention relates to a liquid crystal display device, and more particularly to a backlight unit for a liquid crystal display device. The present invention is also directed to a method of assembling the backlight unit which makes it easy to inspect for impurities and reduces the damage to an optical sheet.

2. Description of the Related Art

Generally, a liquid crystal display device has a liquid crystal display panel consisting of a plurality of liquid crystal cells arranged in a type of matrix and a plurality of control switches for switching a video signal to be supplied to each liquid crystal cell, and for controlling the transmittance of the light supplied from a backlight unit with the liquid crystal display panel to display a desired picture on a screen.

When compared to a Cathode Ray Tube, such a liquid crystal display device is possible to be made in a small size so that it can be applied to Office Automation Equipment such as a photocopying machine, etc., and Potable devices such as a mobile phone and a pager, etc., as well as a personal computer PC and a notebook computer.

A light guide panel method is widely used as a backlight unit, which supplies light to the liquid crystal display device, since it is required to make the screen of the liquid crystal display device bigger in size, better in displaying color and more elegant in appearance.

Accordingly, there has actively been carried out research and development for high and uniform brightness, thinness and lightness of a backlight unit.

Referring to FIG. 1, a backlight unit of a conventional liquid crystal display device includes a lamp assembly 10 consisting of a lamp 10a for generating light and a lamp housing 10b installed in the shape of a cover for lamp 10a; a light guide panel 14 for converting the light incident from the lamp assembly 10 into a planar light source; a reflection plate 12 located at the bottom thereof for reflecting the light, which progresses toward a lower surface or a side surface of the light guide panel 14, to an upper surface; a bottom cover 20 installed under the reflection plate 12; optical sheets 16 for diffusing the light passed through the light guide plate 14 and controlling the direction in which the light progresses; and a main support 18 mounted on the optical sheets 16.

A cold cathode fluorescent lamp CCFL is mainly used for the lamp 10a. The light generated in the lamp 10a is incident to the light guide panel 14 through an incidence surface in the side surface of the light guide panel 14. Two or three lamps 10a can be installed to achieve high brightness of the liquid crystal display device. The inside surface of the lamp housing 10b has a reflective surface for reflecting the light from the lamp 10a to the light guide panel 14. The reflection plate 12 is installed facing the rear of the light guide panel 14. The light guide panel 14 receives the light incident from the lamp 10a to reach a long distance from the lamp 10a. The light guide panel 14 is normally formed of an acrylic acid resin PMMA, which has good strength so as not to be easily deformed or broken while providing good transmittance. The reflection plate 12 reflects the light incident to itself through the rear of the light guide panel 14 toward the light guide panel 14, thereby reducing light loss. The light transmitted to the lower surface and the side surface of the light guide panel 14 is reflected at the reflection plate 12 and progresses toward the surface of the light guide panel 14 from which light emanates. The bottom cover 20 is located under the reflection plate 12 for supporting the components of the backlight unit on the bottom cover 20.

The optical sheets 16 is composed of a first diffusion sheet, a first and a second prism sheet for controlling the progress direction of the light passed though the first diffusion sheet, and a second diffusion sheet for diffusing the light passed though the first and the second prism sheet. The light passing through the light-emanating surface of the light guide panel 14 is incident to the first diffusion sheet among the optical sheets 16 to be diffused. On the other hand, when the light is perpendicularly incident to the liquid crystal display panel (not shown), it has a higher light efficiency. For this, two forward prism sheets are deposited for the progress angle of the light coming out of the light guide panel 14 to be perpendicular to the liquid crystal display panel. The light passed through the first and the second prism sheet is incident to the liquid crystal display panel via the second diffusion sheet.

A main support 18 is a major supporting part of the backlight unit and supports the whole of the backlight unit and the liquid crystal display panel.

In conjunction with FIG. 2, there is explained below a method of assembling the backlight unit with such a configuration.

Referring to FIG. 2, the backlight unit is assembled in reverse direction, and first of all the optical sheets 16 are disposed on the main support 18, and the first diffusion sheet, the two prism sheets and the second optical sheet are sequentially deposited on the main support 18. Then, the lamp assembly 10 and the reflection plate 12 is combined to both sides of the light guide panel 14. The reflection plate 12 is mounted on one surface of the light guide panel 14 and inside the lamp housing 10a. The light guide panel 14 combined with the lamp assembly 10 and the reflection plate 12 in this way is then assembled on the optical sheets 16. Then, after the bottom cover 20 is mounted on the light guide panel 14, the wiring of the backlight unit is adjusted for supplying voltage generating a light to complete the backlight unit. An liquid crystal display panel is assembled to the backlight unit assembled in such a way.

If the backlight unit is assembled in a reverse direction, it is not possible to inspect for impurities generated in the course of its assembly. That is, while the inspection of generated impurities can be carried out through a lighting inspection, the light assembly 10 being the light source required for the lighting inspection is assembled after the optical sheets 16 are assembled. Accordingly, because the lighting inspection is carried out after the optical sheets 16 have been assembled, it becomes difficult to eliminate the impurities generated at the optical sheets 16. Therefore, a JIG that irradiates light for inspecting whether or not impurities is generated, is separately required. Also, when assembling the backlight unit in the reverse direction, because the optical sheets 16 are deposited on the main support 18 before anything else, damage of the optical sheets 16 is likely. Moreover, because the wire of the backlight unit is long, it becomes difficult to adjust the wire at the end of the assembly. Thus, there arises the necessity of a new assembly method of the backlight unit to solve these problems.

SUMMARY OF THE INVENTION

Accordingly, it is an object of the present invention to provide a backlight unit for a liquid crystal display device that is capable of making it easy to inspect for impurities and reducing damage to the optical sheet.

In order to achieve these and other objects of the present invention, a backlight unit for a liquid crystal display device according to one aspect of the present invention includes a lamp assembly consisting of a light source for generating light and a lamp housing installed in the shape of and covering the light source for reflecting the light; a light guide panel for providing the light from the lamp assembly incident to a display panel; and a bottom cover for supporting the lamp assembly and the light guide panel, wherein the distance between the lamp assembly located at both edges of the bottom cover is longer than the length of the light guide panel.

The backlight unit further includes a reflection plate for reflecting the light from the light guide plate upwards; a plurality of optical sheets for diffusing the light reflected from the light guide panel and uniformly progressing at the same time; and a main support installed on the optical sheets and on which a display panel is disposed.

A method of assembling a backlight unit of a liquid crystal display device according to another aspect of the present invention includes the steps of installing a lamp assembly at both edges of a bottom cover; installing a reflection plate on the bottom cover where the lamp assembly is installed; disposing a light guide panel on the reflection plate; depositing a plurality of optical sheets on the light guide panel; and installing a main support on the optical sheets.

In the method, the distance between the lamp assembly located at both edges of the bottom cover is longer than the length of the light guide panel.

In this method, the step of installing the lamp assembly further includes the step of adjusting the wire which is connected to a power source for supplying voltage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
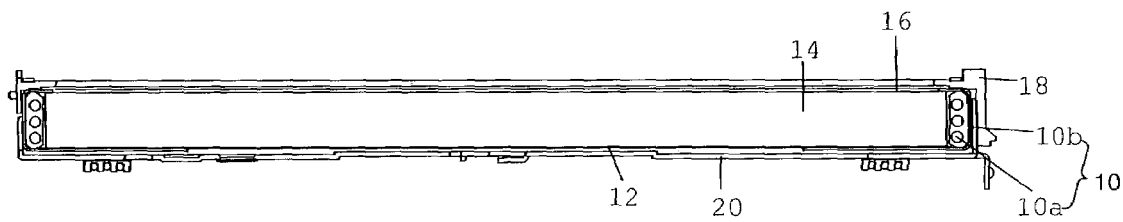
FIG. 1 is a sectional view illustrating a backlight unit of a conventional liquid crystal display device.
Figure 2:
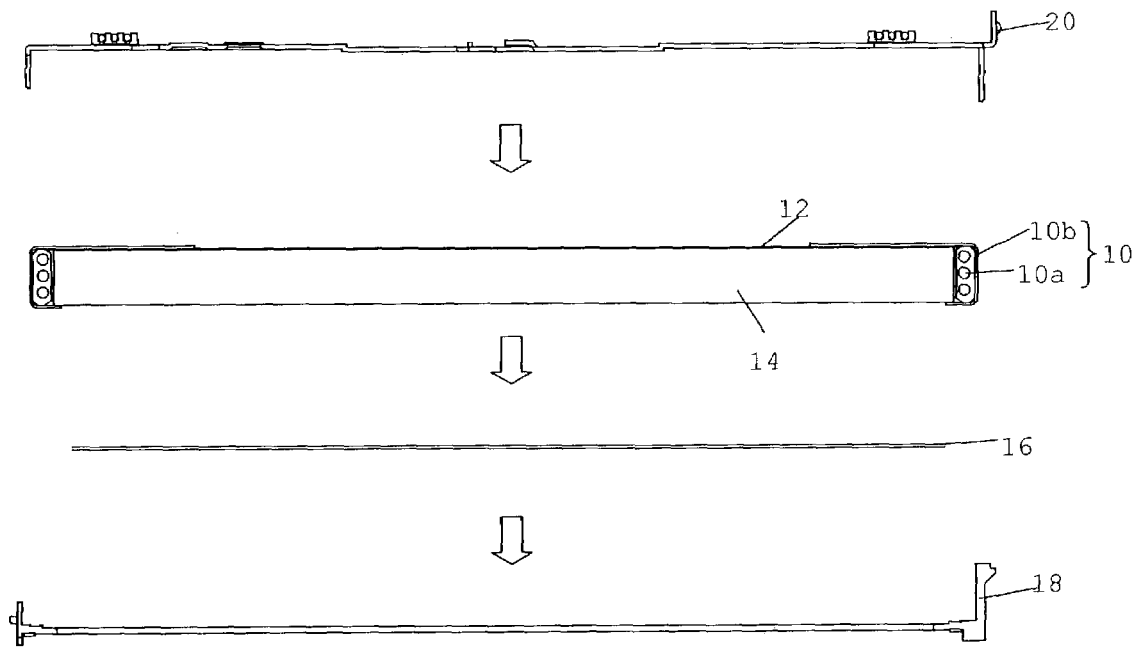
FIG. 2 is a view showing how to assemble the backlight unit illustrated in FIG. 1.
Figure 3:
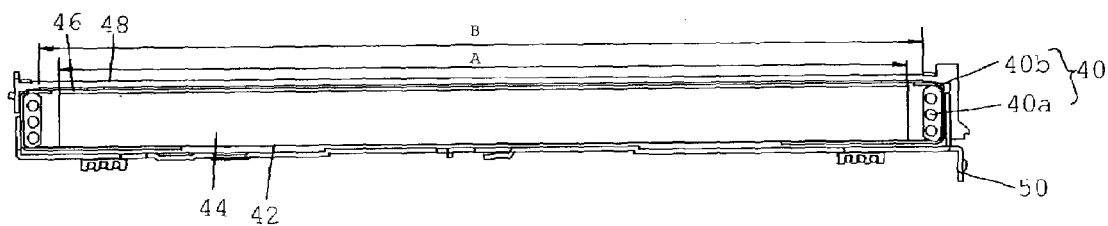
FIG. 3 is a sectional view illustrating a backlight unit of a liquid crystal display device according to an embodiment of the present invention.
Figure 4:
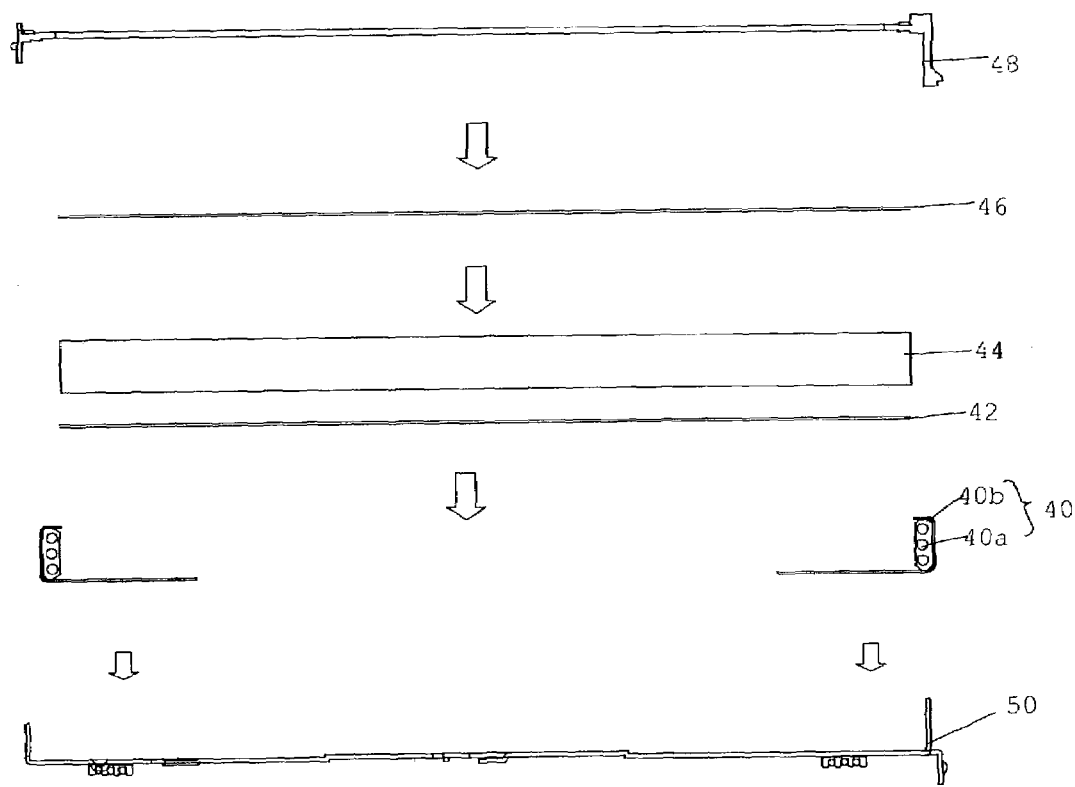
FIG. 4 is a view showing how to assemble the backlight unit illustrated in FIG. 3.

With reference to FIGS. 3 to 4, there is explained a preferred embodiment of the present invention as follows.

Referring to FIG. 3, a backlight unit of a liquid crystal display device according to the present invention includes a lamp assembly 40 consisting of a lamp 40a for generating light and a lamp housing 40b installed as a covering for the lamp 40a and a light guide panel 44 for converting the light incident from the lamp assembly 40 into a planar light source. The length A in FIG. 3 is shorter than the distance B between the light assembly 40 formed at opposite sides thereof. A reflection plate 42 is located at the bottom thereof for reflecting the light which progresses toward a lower surface or a side surface of the light guide panel 44 to an upper surface. A bottom cover 50 is installed under the reflection plate 42 and an optical sheet 46 is provided for diffusing the light which passes through the light guide plate 44 and for controlling the direction in which the light progresses. A main support 48 is mounted on the optical sheet 46.

A cold cathode fluorescent lamp CCFL is primarily used as the lamp 40a. The light generated in the lamp 40a is incident to the light guide panel 44 through an incidence surface provided in the side surface of the light guide panel 44. Two or three lamps 40a can be installed to achieve high brightness of the liquid crystal display device. The lamp housing 40b has a reflection surface inside thereof to reflect the light from the lamp 40a to the light guide panel 44. The reflection plate 42 is installed facing the rear of the light guide panel 44. The light guide panel 44 receives the light incident from the lamp 40a to transmit it far from the lamp 40a. The light guide panel 44 is normally formed of an acrylic acid resin PMMA, which has good strength so as not to be easily deformed or broken also possesses and good transmittance. The light guide panel 44 is made to have its length A shorter than the distance B between the lamp assembly 40 in order to be assembled after the lamp assembly 40 is assembled on a bottom cover 50. The reflection plate 42 reflects the light incident to itself through the rear of the light guide panel 44 toward the light guide panel 44, thereby reducing light loss. The light which progresses to the lower surface and the side surface of the light guide panel 44 is reflected at the reflection plate 42 and progresses toward the surface of the light guide panel 44 from which light emanates. The bottom cover 50 is located under the reflection plate 42 for supporting the components of the backlight unit on the bottom cover 50.

The optical sheet 46 is composed of a first diffusion sheet, a first and a second prism sheet for controlling the progress direction of the light passing though the first diffusion sheet, and a second diffusion sheet for diffusing the light passing though the first and second prism sheet. The light passing through the outer surface of the light guide panel 44 is incident to the first diffusion sheet among the optical sheets 46 to be diffused. On the other hand, when the light is perpendicularly incident to the liquid crystal display panel (not shown), it has a higher light efficiency. Thus, two forward prism sheets are deposited for facilitating the angle of the light emanating from the light guide panel 44, perpendicular to the liquid crystal display panel. The light passing through the first and the second prism sheet is incident to the liquid crystal display panel via the second diffusion sheet.

A main support 48 supports the whole of the backlight unit and the liquid crystal display panel.

In conjunction with FIG. 4, there is explained a process of assembling the backlight unit with such a configuration, as follows.

Referring to FIG. 4, the backlight unit according to the present invention is assembled in a forward direction. To described this more particularly, first of all, the light assembly 40 is installed on the bottom cover 50. At this moment, the wire connected to the power source supplying voltage to the lamp assembly 40 for generating light is adjusted. The lamp assembly 40 consists of lamp 40a and lamp housing 40b covering the lamp 40a. The lamp assembly is located at both edges of the bottom cover 50. Because the lamp assembly 40 is installed first, when conducting the subsequent assembly steps, an inspection can be carried out using the light generated from the lamp 40a, thereby effectively determining the occurrence of impurities in the course of the manufacturing process. Accordingly, since the inspection for impurities can be easily accomplished, a separate JIG becomes unnecessary for the impurities inspection.

The reflection plate 42 is installed on the bottom cover 50 where the lamp assembly 40 is installed. The light guide panel 44 is disposed on the bottom cover 50 where the reflection plate 42 is installed. The light guide panel 44 is inserted into the space provided between the lamp assembly 40 installed at both sides of the backlight unit. Because the distance B between the lamp assembly 40 is longer than the entire length A of the light guide panel 44, the light guide panel can be placed on the cover bottom 50 without any interference. The optical sheets 46 are placed onto the light guide panel 44. The optical sheets 46 include the first diffusion sheet, the two prism sheets and the second diffusion sheet, and there are sequentially deposited the first diffusion sheet, the two prism sheets and the second diffusion sheet on the light guide panel 44. Then, the main support 48 is installed on the optical sheets 46 to complete the backlight unit. A liquid crystal display panel is assembled on the backlight unit assembled in such a way.

By assembling the backlight unit in a forward direction, the occurrence of the damage of the optical sheets 46 can be reduced in the course of the assembly. Also, because the wire is adjusted while assembling the lamp assembly 40, the wire can be adjusted in advance when compared with the previous way of assembly, thereby reducing problems in this regard.

As described above, the backlight unit of the liquid crystal display device and the assembling method thereof according to the present invention has the lamp assembly, the reflection plate, the light guide panel, the optical sheets and the main support sequentially assembled on the cover bottom to make it easy to observe the impurities introduced in the course of the assembly process. Accordingly, the backlight unit of the liquid crystal display device and the assembling method thereof according to the present invention can reduce damage to the optical sheets. Further more, the backlight unit of the liquid crystal display device and the assembling method thereof according to the present invention, when assembling the lamp assembly, adjusts the wire beforehand, thereby preventing problems caused by the wire from occurring.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A backlight unit of a liquid crystal display, which comprises:

at least two lamp assemblies, each lamp assembly including a light source for generating light and a lamp housing with a shape to cover the light source for reflecting light, each of the at least two lamp assemblies having a single piece L-shaped element having an upper edge and a lower edge opposing to the upper edge, the single-piece L-shaped element of one lamp assembly being separated from the single-piece L-shaped element of another lamp assembly;

a single light guide panel for making the light from the lamp assemblies incident to a display panel; and a bottom cover for supporting the lamp assemblies, the light guide panel and lower edges of the L-shaped elements, wherein the distance between the opposing upper edges of each single-piece L-shaped element of the at least two lamp assemblies is longer than the length of the light guide panel to permit the light guide panel to fit through the space between the opposing upper edges of the lamp assemblies to be assembled by being lowered to the bottom cover without obstruction by the opposing upper edges of the lamp assemblies when the backlight unit is assembled, and wherein the opposing lower edges of the single-piece L-shaped elements of the lamp assemblies extend beneath the light guide panel.

2. The backlight unit of a liquid crystal display according to claim 1, further comprising:

a reflection plate for reflecting the light upwards from the light guide panel;

an optical sheet for diffusing the light reflected from the light guide panel; and a main support installed on the optical sheet and on which the display panel is disposed for supporting the whole of the backlight unit and the liquid crystal display panel.

3. The backlight unit of a liquid crystal display according to claim 2, wherein the reflection plate is disposed between the lamp assemblies and the light guide panel.

4. The backlight unit of a liquid crystal display according to claim 3, wherein the plurality of optical sheets are provided between the light guide panel and the main support.

5. A method of assembling a backlight unit of a liquid crystal display, comprising steps of:

lowering at least two lamp assemblies to both edges of a bottom cover, respectively without obstruction, the bottom cover having structures located at both edges adapted to abut the lamp assemblies, and to keep upper edges of the lamp assemblies at a fixed maximum distance from one another;

next lowering a reflection plate having a length less than the fixed maximum distance onto the bottom cover where the lamp assemblies are installed without obstruction;

next lowering a single light guide panel having a length less than the fixed maximum distance onto the reflection plate without obstruction;

next depositing an optical sheet having a length less than the fixed maximum distance on the light guide panel without obstruction; and next installing a main support on the optical sheet.

6. The method according to claim 5, wherein the step of installing the lamp assemblies further includes the step of adjusting the wire connected to a power source which supplies the voltage.

7. A method of assembling a backlight unit of a liquid crystal display, comprising steps of:

lowering at least two lamp assemblies to both edges of a bottom cover, respectively without obstruction, the bottom cover having structures located at both edges adapted to abut the lamp assemblies, and to keep upper edges of the lamp assemblies at a fixed maximum distance from one another;

next lowering a reflection plate having a length less than the fixed maximum distance onto the bottom cover where the lamp assemblies are installed without obstruction;

next lowering a single light guide panel having a length less than the fixed maximum distance onto the reflection plate without obstruction;

next depositing an optical sheet having a length less than the fixed maximum distance on the light guide panel without obstruction;

next installing a main support on the optical sheet; and turning on a lamp assembly to emit light to illuminate and permit visual inspection of impurities in the assembly.

* * * * *